(No Model.)
E. STRETCH.
MEANS FOR RAISING OIL BY WATER PRESSURE.
No. 606,432. Patented June 28, 1898.
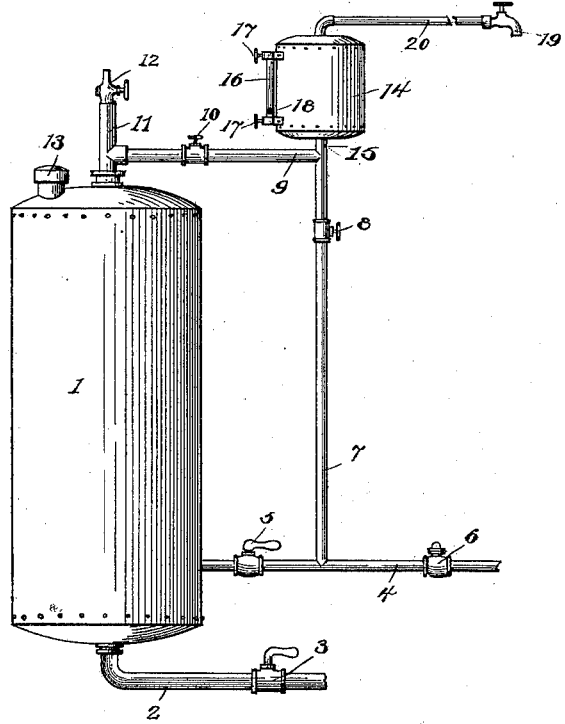
Witnesses:
Fenton S. Belt,
J. Albillson.
Inventor:
Elisha Stretch,
by H. B. Willson & Co,
Attorney.

UNITED STATES PATENT OFFICE.

ELISHA STRETCH, OF EAST ORANGE, NEW JERSEY, ASSIGNOR OF ONE-HALF TO MARGARET ELIZABETH STRETCH, OF SAME PLACE.

MEANS FOR RAISING OIL BY WATER-PRESSURE.

SPECIFICATION forming part of Letters Patent No. 606,432, dated June 28, 1898.

Application filed September 9, 1897. Serial No. 651,133. (No model.)

*To all whom it may concern:*

Be it known that I, ELISHA STRETCH, a citizen of the United States, residing at East Orange, in the county of Essex and State of New Jersey, have invented certain new and useful Improvements in Means for Raising Oil by Water-Pressure; and I do declare the following to be a full, clear, and exact description of the invention, such as will enable others skilled in the art to which it appertains to make and use the same.

My invention relates to a means for raising oil by hydrostatic or water pressure; and the object is to provide a simple and effective device for raising oil from tanks located in a cellar, basement, or underground, so that the same may be conveniently dispensed at will.

To this end the invention consists in the construction, combination, and arrangement of the several parts of the device, as will be hereinafter more fully described, and particularly pointed out in the claims.

The figure in the drawing is a schematic plan of a device embodying my invention for raising oil.

1 represents the main storage-tank, and it may be of any suitable size and shape to correspond to the locality and use for which it is intended, and it may likewise be located at any convenient point above or below the surface of the ground. The bottom of said tank is connected by a pipe 2 and valve 3 with the sewer or other wasteway, and near its lower end is connected a water-inlet pipe 4, connecting said tank 1 with the water-main or other source of water under pressure. This water-inlet pipe 4 is provided with a valve 5 and a check-valve 6, and between said valves 5 and 6 is a vertical branch pipe 7, the upper end of which is provided with a valve 8 and with a lateral pipe 9, having a valve 10 connected to a vertical pipe 11, fixed in the upper end or highest point of the tank 1, and the upper end of said vertical pipe 11 terminates in an air-vent valve 12.

13 represents the removable screw-cap, by means of which the tank 1 is charged or filled with oil.

14 represents the gage-tank, its bottom being provided with an inlet-pipe 15 in common connection with the pipes 7 and 9.

16 represents a vertical gage-glass connected to the gage-tank 14 by the cock-couplings 17 17, and 18 represents a float-ball traveling in said gage-glass. This float-ball 18 is of such a specific gravity that it will sink in the oil, but will float on the surface of the water.

19 represents the supply or discharge cock connected by the pipe 20 with the upper end of the gage-tank 14 and is the point at which the oil is drawn for sale or consumption.

The operation of the device is as follows: The screw-cap 13 is removed, and all the valves except the air-vent 5 are closed and the tank 1 filled with oil. The screw-cap 13 is now replaced and the air-vent 5 is closed. The discharge-cock 19 is now opened, as well as the valve 6, connecting the main tank 1 with the gage-tank 14, and the valve 5 is also opened, which admits the pressure of water from the main to the bottom of the tank 1, which raises the oil in the tank 1 through the valve 6 into the tank 14, forcing the air out through the cock 19, and as soon as the oil reaches this point, by reason of the water-pressure beneath, said cock or valve 19 is closed and the device is ready for drawing the oil, as desired. When the oil is being drawn off and the water-level reaches the gage-glass 16, it raises the float-ball 18, so that when a given point is reached the cock or valve 6 is closed, as well as the valve 5, at the same time opening the valve 8. This operation "cuts out" the main tank 1 and conveys the water-pressure direct to the gage-tank 14, from which the limited amount of oil therein may be drawn, as before. During this time the main tank 1 may be emptied of its water by opening the air-vent 5 and the discharge-valve 3 to permit the contents of said tank to be carried off in the sewer, and said tank 1 is ready for another charge of oil by closing the cock 3 and removing the screw-cap 13. After said tank has been refilled the screw-cap is replaced and the air-valve 5 closed. The valves 5 and 6 are now opened and the valve 8 closed. This permits the water in the gage-tank 14 to fall by gravity into the tank 1, the oil in said tank 1 rising in the gage-tank 14 to replace the space occupied by the water, and the device is again ready for service.

The object of the check-valve 6 is to prevent the backflow of oil contaminating the supply or service pipes.

In the form shown in the drawing I have dispensed with the gage-tank 14 and the vertical pipe 7 and connecting the discharge-cock 19 to the pipe 9. At the same time the gage-glass, with its float-ball, is attached to the upper end of the main tank 1, and the general action of the device is the same as in the first instance.

Although I have specifically described the construction and relative arrangement of the several elements of my invention, I do not desire to be confined to the same, as such changes or modifications may be made as clearly fall within the scope of my invention without departing from the spirit thereof.

Having thus fully described my invention, what I claim as new and useful, and desire to secure by Letters Patent of the United States, is—

1. The main or storage tank 1, the refuse-pipe 2, and valve 3, the water-inlet pipe 4, the valves 5 and 6, the branch pipe 7, and its valve 8 in combination with the gage-tank 14, the pipes 9 and 15 connecting both tanks and the valved pipe 7, the visual gage connected to the tank 14, and means for discharging the contents of said latter tank, as and for the purpose set forth.

2. The main or storage tank 1, the refuse-pipe 2, and valve 3, the vented oil-discharge pipe 11, in combination with the gage-tank 14, the visual gage 16 connected to said tank, and the float-ball 18 mounted in said gage, the water-supply pipe 4 connected to the main tank, and the branch pipes 7 9 and 15 connecting said supply-pipe 4 and tanks 1 and 14, and means for controlling the discharge from the tank 14, substantially as shown and described.

In testimony whereof I hereunto affix my signature in presence of two witnesses.

ELISHA STRETCH.

Witnesses:
JOSEPH STRETCH,
ELIAKIM S. STRETCH.